(12) United States Patent
Barnes

(10) Patent No.: US 7,025,320 B2
(45) Date of Patent: Apr. 11, 2006

(54) WALL ARTICLE HANGER FOR D-RING AND METHOD OF USE

(76) Inventor: Renny Barnes, 8228 Richmond Hwy., Alexandria, VA (US) 22309

( * ) Notice: Subject to any disclaimer, the term of this patent is extended or adjusted under 35 U.S.C. 154(b) by 0 days.

(21) Appl. No.: 10/774,396

(22) Filed: Feb. 10, 2004

(65) Prior Publication Data

US 2005/0173611 A1 Aug. 11, 2005

(51) Int. Cl.
*A47G 1/16* (2006.01)
(52) U.S. Cl. .................. 248/489; 248/217.3; 248/493
(58) Field of Classification Search ............. 248/690, 248/684, 489, 493, 497, 216.1, 217.3
See application file for complete search history.

(56) References Cited

U.S. PATENT DOCUMENTS

| | | | | |
|---|---|---|---|---|
| 165,206 A * | 7/1875 | Brown | ........................ | 248/489 |
| 454,111 A * | 6/1891 | Coupe | ........................ | 248/493 |
| 1,616,957 A * | 2/1927 | Honigbaum | ............. | 248/217.3 |
| 1,914,951 A * | 6/1933 | Kiessling | .................... | 248/498 |
| 2,454,813 A * | 11/1948 | Larson | ........................ | 248/493 |
| 2,686,641 A * | 8/1954 | Friedrich | .................... | 248/490 |
| 3,298,651 A * | 1/1967 | Passer | ...................... | 248/217.2 |
| 3,501,124 A * | 3/1970 | Goss | ........................... | 248/495 |
| 4,333,625 A * | 6/1982 | Haug | ....................... | 248/216.1 |
| 5,069,412 A * | 12/1991 | Jacob | .......................... | 248/493 |
| 5,236,168 A * | 8/1993 | Roy | ........................... | 248/546 |
| D339,981 S | 10/1993 | Barnes | | |
| 5,267,718 A * | 12/1993 | Sheehan | .................. | 248/475.1 |
| 5,267,719 A * | 12/1993 | Keller | ......................... | 248/493 |
| 5,269,487 A * | 12/1993 | Heitzman | .................. | 248/489 |
| 5,328,139 A | 7/1994 | Barnes | | |
| 5,588,629 A | 12/1996 | Barnes | | |
| 5,758,858 A | 6/1998 | Barnes | | |
| 6,095,478 A | 8/2000 | Barnes | | |
| 6,641,107 B1 * | 11/2003 | Janssen | ...................... | 248/493 |
| 6,783,106 B1 * | 8/2004 | Barnes | ....................... | 248/476 |
| 6,830,228 B1 * | 12/2004 | Ernst | ........................ | 248/475.1 |
| 2002/0166930 A1 | 11/2002 | Barnes | | |

* cited by examiner

*Primary Examiner*—Anita M. King
(74) *Attorney, Agent, or Firm*—Clark & Brody

(57) ABSTRACT

A wall article hanger and method of hanging a wall article that uses a d-ring assembly comprises providing a prong-containing hanger device that attaches to the d-ring assembly and remains in a relatively vertical position after being attached. With the hanger device in place, the prongs are angled towards the wall surface that the wall article is to be hung on. The wall article can then be pushed toward the wall, such that the prongs penetrate the wall and support the wall article.

5 Claims, 2 Drawing Sheets

WALL ARTICLE HANGER FOR D-RING AND METHOD OF USE

FIELD OF THE INVENTION

The present invention is directed to a wall article hanger and a method of use, and in particular, to a hanger that is especially adapted to interface with a d-ring assembly mounted on the back of a wall article.

BACKGROUND ART

In the prior art, a number of techniques are employed to hang a wall article such as a picture, painting, mirror, tapestry, etc. One such technique employs a nail or other member that is attached to the wall, whereby the nail acts as the support for the article to be hung. The article to be hung can then be fitted with a wire, and the wire is slipped over the protruding nail to support the article. The article can also use other types of hanging devices such as serrated plates that are attached to the back of a frame, with the nail engaging one of the serrations on the plate for frame support. The article can also be hung by attaching a hanger device having a loop, whereby the nail would engage the loop for article support.

A picture hanger using a loop is illustrated in FIG. 1 and is commonly referred to as a d-ring. In fact, the d-ring is an assembly of a bent plate and a ring. The d-ring assembly of FIG. 1 is designated by the reference numeral 10 and includes a plate 1 that is bent or folded at 2 to form a pair of opposing plate sections 3 and 5. Each section has a pair of openings 7, each of which being sized to allow a fastener, e.g., a screw, nail, or the like to pass through the openings 7 and secure the two plate sections 3 and 5 to a wall article.

The plate is shaped at fold 2 with an opening 9 and a pair of curved folds 11. The ring 13 passes through each curved fold 11, each end of the ring 13 being bent upwardly at the opening 15 that is between the folds 11 to retain the ring in place. Once the plate 1 is attached to a wall article, the ring 13 can hang on a nail or other protrusion from a wall to support the wall article. In another use, two spaced apart d-ring assemblies 10 can be utilized with a wire extending between the two, the wire being used to hang onto a nail protruding from the wall.

Another class of wall article hanging devices are disclosed in U.S. Pat. Nos. D339,981, 5,328,139, 5,588,629, 5,758,858, and 6,095,478 to Barnes. These patents run counter to the conventional wall article hanging techniques that first attach an element to the wall, and then hang the wall article off that wall element. In the Barnes' patents, a hanging device is first attached to the wall article to be hung, and then the wall article is secured to a wall surface. Using the Barnes' device and method, there is no need for locating a nail or the like at a predetermined location on the wall so as to position the wall article in the proper location. That is, the wall article itself is used for positioning in the proper site on the wall.

The Barnes' devices are also advantageous in that the wall article is secured in such a fashion that the article remains stationary after attachment, and the constant article leveling that goes on when a wire and nail are used is eliminated.

The hangers of the Barnes' patents are designed to be attached to a wall article frame using prongs of the device itself or fasteners.

Another Barnes hanger is disclosed in co-pending application Ser. No. 09/851,323 as a two piece system with a first piece attached to the wall article and a second piece designed to engage the wall surface and link to the first piece attached to the wall article for wall article support. This arrangement can even use a specially modified d-ring as the first piece, wherein the d-ring employs flanges or other means to establish the link with the second piece for wall article support. While this type of a wall article hanger is useful, it still requires modification of the prior art d-ring.

Accordingly, a need still exists to hang pictures using the Barnes methodology and the d-ring concept but without having to modify existing d-ring assemblies. The present invention solves this need by providing a wall article hanger device that interfaces with prior art d-ring assemblies to allow the wall article employing the d-ring assembly to be attached to the wall without the need for a wire and a nail or aligning the d-rings with nails, or other fasteners extending from the wall.

SUMMARY OF THE INVENTION

It is a first object of the present invention to provide an improved wall article hanging device.

Another object of the invention is to provide a hanging device that is adapted for use with prior art d-ring assemblies.

Still another object of the invention is a method of hanging wall articles that employ d-ring assemblies.

Other objects and advantages of the present invention will become apparent as a description thereof proceeds.

In satisfaction of the foregoing objects and advantages, the present invention provides an improved wall article hanger for use with a d-ring assembly having a plate body adapted to attach to the wall article and a movable ring mounted to the plate body. The inventive hanger comprises an elongated body having a first end portion and a center portion having one or more arms extending from the center portion and adapted to attach to the movable ring. A second end portion is provided that has at least one prong protruding at an angle from a longitudinal axis of the elongated body. The prong is adapted to penetrate the wall to support the wall article. The elongated body is sized in length so that the first end portion contacts a portion of the plate body to keep the elongated body generally aligned with the d-ring assembly after attachment thereto.

The second end portion can have a plate, the plate forming a bridge between the at least one prong or plate body and a rear surface of the wall article so that forces applied to the wall article are transmitted directly to the at least one prong via the plate.

The hanger can use a pair of arms with each arm extending from a side of the elongated body. The arm or arms can have a curved shape to accommodate attachment to the d-ring or an l-shape. The free end of the arm or arms can also be curved to ease attachment to the ring.

More than one prong can be used, and the prongs can have various configurations providing they are adapted to penetrate the wall surface, preferable dry wall.

The invention also entails a method of hanging the wall article using the d-ring assembly and the hanger. In one mode, the elongated body is attached to the ring of the D-ring assembly. The wall article is then pressed against a wall surface so that the at least one prong on the body penetrates the wall surface to support the wall article. When using the plate on the body, the wall article pressing step causes the rear surface of the wall article to press against the plate, thereby directing the wall article pressing force along the plate and to the prong so as to maximize the pressing effect.

BRIEF DESCRIPTION OF THE DRAWINGS

Reference is now made to the drawings of the invention wherein.

DESCRIPTION OF THE PREFERRED EMBODIMENTS

The present invention offers significant advantages in the field of hanging wall articles. The invention overcomes the problems of having to use wire and nail or accurately positioned nails of the like when trying to hang wall articles with d-ring assemblies. With the inventive wall article hanging device, there is no need to use wires and/or nails in a wall to hang a wall article such as a picture. There is also no need to use nails, moly bolts or other fasteners to hang a picture or other wall article that has one or more d-ring assemblies attached to a back thereof. With the inventive hanging device, one merely has to attach the inventive hanger to the ring of the d-ring assembly, position the wall article in its desired location, and push the wall article towards the wall so that the prongs on the wall article hanger penetrate the wall to support the wall article.

Figure 2:
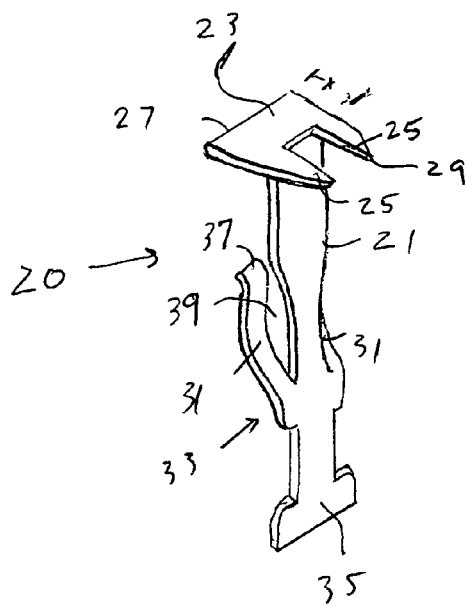
FIG. 2 is a perspective view of one embodiment of the wall article hanger of the present invention.

Referring now to FIG. 2, one embodiment of the present invention has a wall article hanger is designated by the reference numeral 20 with a main plate-like body 21. The hanger 20 also a plate 23 and a pair of prongs disposed at one end of the body 21. The plate 23 and prongs 25 are angled with respect to the longitudinal axis of the plate body 21. Each of prongs 25 is intended to penetrate a wall for support of a wall article. The function of the plate 23 will be described below. While the prongs 25 are shown as being plate-like, they could take on other shapes such as pins with a circular or similar cross sectional shape or virtually any other shape that could penetrate a given wall surface for hanging of the wall article. The preferred wall surface is one that is easily penetrated by the prongs, e.g., sheet rock or the like.

The plate 23 has a length "x" measured from the edge 27 to the intersection of the body 21 and the plate 23. The prongs extend from this intersection as well. The significance of the dimension "x" will be described below.

Beside the capability to attach to a wall surface, a second aspect of the hanger of the invention entails attachment to a d-ring assembly. To achieve this in one mode, the body 21 has a pair of arms 31 extending from a mid section portion 33. The arms 31 have a first curvature to accommodate the ring 13 of the d-ring assembly 10 of FIG. 1 when the hanger is attached to the d-ring assembly. The arms also have ends 37, each curved in an opposite fashion to entry of the ring 13 into the space 39 created by the arms 31.

A third aspect of the hanger of the invention is an anti-rotation feature to ensure that the hanger 20 stays in place during the actual attachment of the wall article to a wall. In this aspect, the body 21 is sized so that a stop portion 35 extends below the mid section portion 33, with the anti-rotation feature discussed below.

Figure 1:
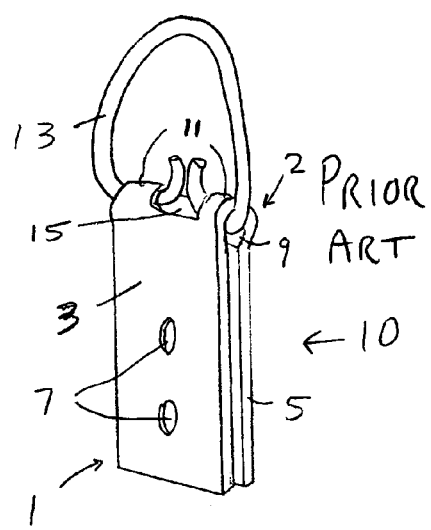
FIG. 1 is a perspective view of a prior art d-ring assembly.
Figure 3:
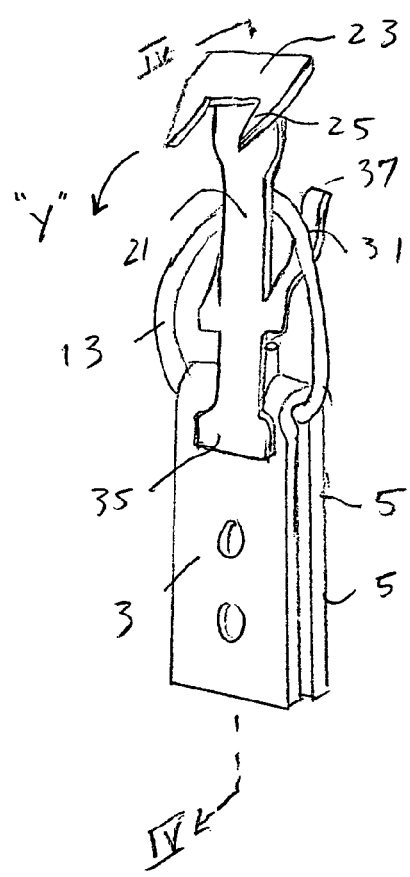
FIG. 3 is a perspective view of the FIG. 2 embodiment in use with the d-ring assembly of FIG. 1.
Figure 4:
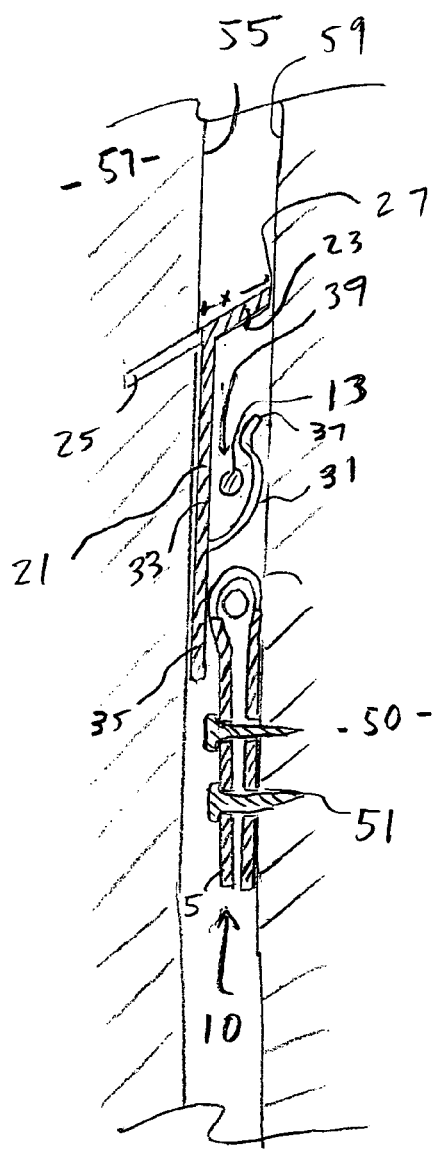
FIG. 4 is a cross section view along the line IV-IV of FIG. 3.

FIGS. 3 and 4 show the hanger 20 attached to the d-ring assembly 10 of FIG. 1. In attaching the hanger 20 to the d-ring assembly 10, the ring 13 is slid against a rear of the body 21 with the ends 37 sliding beneath the d-ring 13. As noted above, the arms 33 are curved in shape to form the space 39, see FIG. 4, to retain the ring 13 in place.

The stop portion 35 extends below the fold 2 of the d-ring assembly 10. The extension of the stop portion 35 prevents the d-ring 13 from rotating in the "Y" direction. This is important when the manner of attaching the wall article to a wall surface is explained. If the stop portion is eliminated, the d-ring 13 could rotate in the "Y" direction and the prongs 25 would not be in the proper orientation for hanging of the wall article. If the stop portion 35 were eliminated, one could hold the hanger 20 upright during the hanging process and hang the wall article. Thus, the inventive hanger could be made without the stop portion 35 just that it would be highly inconvenient since one would then be left with only one hand to hold the wall article.

Besides the anti-rotation feature associated with the stop portion 35, the attachment feature of the arms 31, the wall insertion function of the arms, the hanger employs the plate 23 as a spacer. That is, the plate dimension "x" should be of sufficient length so that when the wall article is attached to the wall, the prongs 25 are properly inserted.

In this regard, the manner of attaching a wall article will now be described. Since this invention is directed to the use of d-ring assemblies, it is assumed that the wall article to be hung as one or more d-ring assemblies. For purposes of explaining how a wall article is hung, a wall article with a one d-ring assembly will be described, although two or more can be used as well. With reference to FIG. 4, the d-ring assembly 10 attached to a wall article 50 using fasteners 51. The hanger 20 is then attached to the d-ring assembly 10 as shown in FIG. 3. It should be noted that in a preferred embodiment, the hanger 20 is attached to the ring 13 so that the stop portion 35 contacts the plate section 5 since the opposing plate section 3 is flat where it contacts the wall article. The plate section 5 has a slight bulge at the fold 2 which would prevent the plate section 5 from lying perfectly flat against the wall article rear face.

With the hanger 20 attached to the d-ring assembly 10, the wall article is positioned on a surface 55 of wall 57 where it is to be hung. Because of the stop portion 35, the longitudinal axis of the hanger 20 remains aligned with a longitudinal axis of the d-ring assembly 10 so that the prongs 25 are in the right position for penetration into the wall 57. Again, without the stop portion 35, one would have to support the hanger 10 so that the prongs are in the proper orientation. With the stop portion 35, the prongs are self-aligned and the wall article 50 is then merely pressed against the wall surface 55. With this pressing action, the prongs 25 contact the wall surface 57, initially forcing the edge 27 against the rear surface 59 of the wall article 50. Further pressing of the wall article 50 forces the prongs 25 into the wall for supporting the pictures.

As is evident from FIG. 4, the prongs 25 are angled with respect to the longitudinal axis of the plate 21 so that the prongs enter the wall on an angle for support purposes. As noted above and in a preferred embodiment, the dimension "x" of the plate 23 should be long enough so that surface 59 of the wall article 50 contacts the edge 27. With this arrangement, the force applied to the wall article is directly applied to the prongs for insertion purposes. If the plate 23 dimension "x" were of insufficient length, a gap would exist between the edge 27 and surface 59, and the prongs would have to be inserted as a result of forces applied to lower portions of the hanger, i.e., on the plate 21 at its mid section portion 33. Therefore, it is preferred that the plate 23 is present and made of sufficient length to allow the pressing force on the wall article to be directly applied to the edge 27.

Preferably, the plate 23 lies in the same plane as the prongs for ease of manufacture. However, the plate could be angled with respect to the prongs without the loss of the spacer function, if so desired.

It should also be understood that it is preferred to use two prongs 25 when using just one hanger, since the presence of two prongs embedded into the wall surface minimizes or prevents rotation of the wall article 50. Of course though, a one prong hanger with one d-ring assembly could be used, if article rotation was not a concern. If a wall article had two d-ring assemblies, a hanger with only one prong could be used with each d-ring assembly, thus leaving two prongs to support the wall article.

The stop portion 35 is shown as being wider than the remainder of the plate 21 in the first embodiment. However, it could take on other configurations, as long as it extended to a point in contact with the plate 1 of the d-ring assembly 10.

Likewise, the arms 31 are exemplary in their shape and design, and other arm configurations could be employed to attach the plate 21 to the d-ring assembly. While the arms have the curved shapes to create the space 39, and make it easier to engage the ring 13, the arms could merely have an l-shape (as viewed from the side) with the spacing between the arms and the back of plate 21 sized to make a tight engagement on the ring 13. As another example, a single arm could be used for attachment purposes, and the arm could extend from a centerline of the body 21, rather than from opposing edges like the FIG. 1 embodiment. Moreover, instead of the arms 31 extending towards the prongs 25, the arms 31 could extend in the opposite direction or toward the stop portion 35. The hanger is preferably made as a unitary or one piece construction, by stamping and forming operations. Of course, though, the hanger 20 could be made in any way providing that the end product embodies at least the wall insertion, and ring attachment functions.

The hanger can be made of any material, but a steel material is preferred due to its strength, and ease of working/forming into the hanger shape.

As such, an invention has been disclosed in terms of preferred embodiments thereof which fulfills each and every one of the objects of the present invention as set forth above and provides a new and improved wall article hanging device and method of use.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A method of hanging a wall article having a d-ring assembly attached thereto comprising the steps of:
    a) first attaching a body to a ring of the d-ring assembly, the body having at least one prong on a first end portion thereof, and extending at an angle from a longitudinal axis of the body,
    b) maintaining the ring of the d-ring in a generally vertical position after the attaching step, and
    c) then pressing the wall article against a wall surface so that the at least one prong penetrates the wall surface to support the wall article.

2. The method of claim 1, wherein a plurality of d-ring assemblies are provided, with a body attached to each ring of each d-ring assembly.

3. The method of claim 1 wherein the body has a plate at the first end portion, the plate being sized so that pressing of the wall article causes a rear surface of the wall article to press against an edge of the plate to drive the at least one prong into the wall surface.

4. The method of claim 1, wherein the maintaining step further comprising sizing the body in length so that a lower portion thereof contacts a portion of the d-ring to prevent rotation of the body.

5. The method of claim 1, wherein the maintaining step further comprising manually holding the ring in the generally vertical position.

* * * * *